United States Patent [19]

Reich

[11] Patent Number: 5,538,138
[45] Date of Patent: Jul. 23, 1996

[54] METHOD AND DEVICE FOR SORTING ITEMS PROVIDED WITH ADDRESS INFORMATION

[75] Inventor: Karl Reich, Radolfzell, Germany

[73] Assignee: Licentia Patent-Verwaltungs GmbH, Frankfurt am Main, Germany

[21] Appl. No.: 278,084

[22] Filed: Jul. 20, 1994

[30] Foreign Application Priority Data

Jul. 20, 1993 [DE] Germany ............... 43 24 255.3

[51] Int. Cl.⁶ .................................................. B07C 5/344
[52] U.S. Cl. ........................... 209/3.3; 209/569; 209/584; 209/900
[58] Field of Search ........................... 209/3.3, 569, 584, 209/546, 900; 235/462, 432

[56] References Cited

U.S. PATENT DOCUMENTS

| | | | |
|---|---|---|---|
| 4,632,252 | 12/1986 | Haruki et al. | 209/900 X |
| 4,800,505 | 1/1989 | Axlerod et al. | 209/3.3 X |
| 4,992,649 | 2/1991 | Mampe et al. | |
| 5,005,124 | 4/1991 | Connell et al. | 209/900 X |
| 5,009,321 | 4/1991 | Keough | 209/900 X |
| 5,042,667 | 8/1991 | Keough | 209/900 X |

FOREIGN PATENT DOCUMENTS

| | | |
|---|---|---|
| 0529966 | 8/1992 | European Pat. Off. |
| 2944144 | 8/1988 | Germany |
| 4000603 | 7/1991 | Germany |

*Primary Examiner*—D. Glenn Dayoan
*Attorney, Agent, or Firm*—Spencer & Frank

[57] ABSTRACT

A method for sorting items provided with address information includes passing the items successively through a scanning device for generating a video image of each item, a mechanical storage track and a printing station. The video images are supplied to a device for automatically reading the address information and assigning a corresponding code. The printing station prints the corresponding code on the items for which the address information can be read within a predetermined time. The video images of the items for which the address information cannot be automatically read within the predetermined time is stored in a buffer. The respectively most recent video image stored in the buffer is supplied to a video coding station for either reading the address information and assigning a corresponding code before the item reaches the printing station at which the code is printed on the item, or if the code is not assigned before the item reaches the printing station, providing the item with an ID tag and printing the ID tag on the item at the printing station. The ID tag is stored in order to provide the item having the ID tag with a corresponding code at a later point in time.

8 Claims, 5 Drawing Sheets

METHOD AND DEVICE FOR SORTING ITEMS PROVIDED WITH ADDRESS INFORMATION

CROSS REFERENCE TO RELATED APPLICATIONS

This application claims the right of foreign priority with respect to application P 43 24 255.3 filed in Germany on Jul. 20, 1993

BACKGROUND OF THE INVENTION

The invention relates to a method for sorting items provided with address information, in which the items successively pass through scanning means for generating a video image of each item, a mechanical storage track, and a printing station. In the known system, the video images are supplied to a first means for reading the address information and assigning a corresponding code. The items for which the address information can be read within a predetermined time are provided with the corresponding code in the printing station, and the video images of the items for which the address information cannot be automatically read within the predetermined time are supplied to video coding stations for reading the address information and assigning a corresponding code. The items that are not provided with a corresponding code are provided with an identification (ID) tag, and the code and ID tag are stored in order to provide the affected items with the code at a later point in time.

The invention further relates to a device for implementing the above described method, including means for scanning and generating a video image of each item, means for automatically reading the address information and for assigning a corresponding code to each video image, video coding stations for reading the address information and assigning a corresponding code to each video image, means for storing the video images and codes, a mechanical storage track, a printing station for characterizing items, and a control unit for controlling the above-named means and components.

In the last ten years tremendous progress has been evident in the development of mail-sorting facilities which has been due to the availability of economical and high-performance computing technology in the area of automatic reading of addresses. Despite this, however, up to now it has not been possible to read all letter addresses of postal items automatically or to automatically read them within a predetermined, acceptable time period. The letters that are not read automatically are either sorted manually or displayed on video displays at work stations, from which the postal code is typed while the letter is located in a mechanical storage track.

In so-called on-line video coding technology, video coding must be completed during the time in which the item is guided in the storage track. Usually only the postal code can be entered by video coding personnel, which permits sorting by primary directions, but not, however, by street and house number. Planning the number of operators proves difficult, because when reading rates, i.e. the proportion of mechanically readable addresses, fluctuate, the appropriate number of coding personnel must be available to enter the postal code manually. The integration of on-line video technology with devices for automatically reading the items, for example optical character recognition (OCR) technology, is already known. The crucial problems occurring in such integration result from the mechanical storage track, which determines how many items can be stored mechanically for further processing, and the non-homogeneous nature of the item flow, which results from the legibility of the addresses provided on the items.

To solve these problems, U.S. Pat. No. 4,992,649 discloses the characterization of each item with a code associated with the electronic or video image of the item. The characterization of each item is effected by applying a code or ID tag to the item that corresponds to the read address. In this known system, items that are not successfully read automatically are provided, in any case, with an ID tag and processed a second time, either by OCR reading electronics or manually by coding personnel at video coding stations. This so-called off-line processing is made possible by storage of video images of the items in an appropriate long-term memory. In this known system, information about letters that are not automatically readable is not lost, because the items receive an ID tag, thereby permitting the above-mentioned second processing of the video images. However, the drawback exists of non-optimum utilization of the option of processing items that are not automatically read and are still located in the storage track, whereby such items are not processed as quickly as possible by coding personnel at the video coding stations and provided with a code associated with the read address information.

Among codings, a distinction is further made between outgoing and incoming coding. In outgoing coding, the items leaving a post office are read and coded in particular according to the postal codes, whereas in incoming coding the incoming items are provided with a corresponding code depending on further components of the address information. In addition, methods of extraction coding, in which certain parts of the address are taken from the address and used in coding, are playing an increasingly important role. If coding takes place at video coding stations in the post office, or in the immediate vicinity thereof, in which the mechanical processing of the items is performed, the relevant coding technique is referred to as local; if, on the other hand, video coding takes place in a spatially separate coding center, the coding technique is called remote.

SUMMARY OF THE INVENTION

It is an object of the present invention to improve the prior art, and particularly to provide a method and device that permit improved processing of items that are not read within a predetermined time period and are still located in a mechanical storage segment.

The above and other objects are accomplished according to the invention by the provision of a method for sorting items provided with address information, including: passing the items successively through scanning means for generating a video image of each item, a mechanical storage segment and a printing station; supplying the video images to a device for automatically reading the address information and assigning a corresponding code; printing in the printing station the corresponding code on the items for which the address information can be read within a predetermined time; storing the video images of the items for which the address information cannot be automatically read within the predetermined time in a buffer; supplying the respectively most recent video image stored in the buffer to a video coding station for either reading the address information and assigning a corresponding code before the item reaches the printing station and then printing the code on the item in the printing station, or if the code is not assigned before the item reaches the printing station, providing the item with an ID tag and then printing the ID tag on the item in the printing station; and storing the ID tag in order to provide the item having the ID tag with a corresponding code at a later point in time.

The invention advantageously allows the coding of a maximum number of items on-line, so that a mere minimum of items needs to be coded off-line. It is also possible, in addition to outgoing coding for a maximum number of items, to perform incoming coding or extraction coding without extending the storage time in the storage track. Depending on the availability of coding personnel, a certain proportion of items can be coded on-line, and the remainder can be provided with an ID tag and, after the intermediately-stored video images of these items have been processed on-line, provided with codes during a second pass. This permits a full workload of the video coding personnel at maximum machine throughput.

It is also ensures that each video processing that is begun is completed. In particular, it is advantageous to work basically slightly under the capacity of video coding personnel. Then, images for video coding may be retrieved from the slowly-filling buffer when the OCR reading rate fluctuates.

It is particularly advantageous to provide combinations according to the invention of on-line/off-line/incoming-outgoing coding in local or remote configurations, and thus adapt the invention to different application conditions.

The invention is described in detail below with reference to the accompanying drawings.

DETAILED DESCRIPTION OF THE PREFERRED EMBODIMENTS

Figure 1:
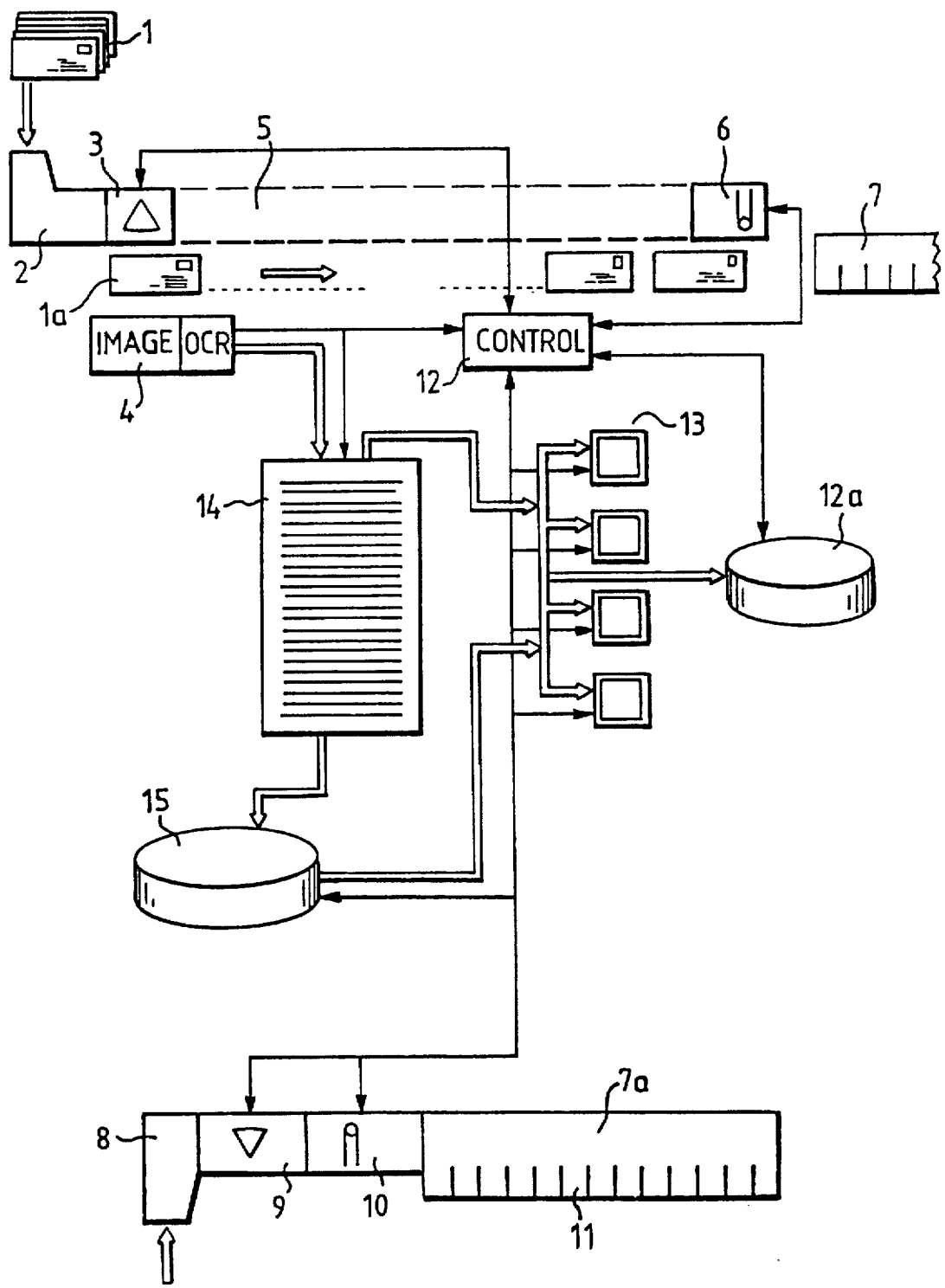
FIG. 1 is a block diagram and schematic which shows the primary components of an arrangement according to the invention.

Referring to FIG. 1, there is shown an arrangement according to the invention wherein items 1 to be processed are supplied by an input station 2 to a scanning station 3, by means of which video images of at least one surface 1a of items 1 are produced that are supplied to means for automatic reading of the address information and allocation of a corresponding code, particularly of a bar code 4. After items 1 are scanned, they enter a mechanical storage track 5 and are conveyed from this track to a printing station 6, where the items are printed with a code that corresponds to the read address information, or an ID tag, so that they can subsequently be automatically sorted in a sorting apparatus 7. The subsequent automatic sorting can be effected by supplying the items to an apparatus 7a by an input apparatus 8, re-read in scanning apparatus 9, possibly provided with additional information in printing station 10, and placed into stacked compartments 11. These components, which are known from U.S. Pat. No. 4,992,649, the subject matter of which is incorporated herein by reference, are controlled by control device 12. It is also known from the prior art to supply video images to video coding stations 13, at which an assignment of corresponding codes to address information read by coding personnel takes place.

Usually the flow of items to be processed contains up to a certain percentage of items provided with address information that cannot be read automatically, or items whose address information cannot be automatically read within a predetermined time period. The maximum time available for reading the address information and assigning a corresponding code, particularly a bar code, during a one-time passing through of the items is further determined by the travel time of an item in the storage segment until it reaches the printing station. The video images of items whose address information cannot be automatically read within the predetermined time are supplied to the video coding stations so that the code can be entered by the video coding personnel. If the coding result is available in time for the relevant item to be printed with the corresponding code in printing station 6, this is effected by controller 12. Otherwise, the relevant item is provided with an ID tag.

In the method according to the invention, the video image of each item that cannot be automatically read within the predetermined time is stored in a buffer, from which the respectively most recent video image is supplied to the video coding stations. The size of the buffer is essentially determined from the holding time of the items in the mechanical storage track and the number of coding personnel. Video images for which a code cannot be provided in time are transferred to a further memory 15, for example, a hard disk, if the number of recent images fill the buffer. Memory 15 preferably operates on a first-in/first-out rule.

When buffer 14 is emptied, old images are fed back from memory 15 to buffer 14. Buffer 14 is maintained at a predetermined filling level of, for example, approximately 80–90%. It is emphasized that the two described memories 14 and 15 must be configured so as not to be physically separated. A sufficiently large storage area that is correspondingly maintained also suffices. Because of the described strategy of making the respectively most recent image stored in memory 14 available to video coding stations 13 (last-in/first-out (LIFO) strategy), it is ensured that a maximum number of items are quickly made available on-line at peak times of high coding capacity at the coding stations, whereas during times of low coding capacity at the coding stations, video image storage on a hard disk can be performed. All movements in LIFO buffer 14 are monitored by control unit 12, which in turn communicates with video coding stations 13. PC's are preferably provided as coding stations. Coding results are transferred from the coding stations to sorting system 7a in case they can be used immediately for sorting; otherwise, they are stored in, for example, a memory that is part of controller 12. For a person skilled in the art, it is obvious to adapt the described method and related device, respectively, to the desired reading depth of the addresses.

The invention can be fundamentally configured so that, in addition to the automatic means for reading the address information, video images are made available to the video coding stations on-line without being placed in intermediate storage in buffer 14.

Figure 2:
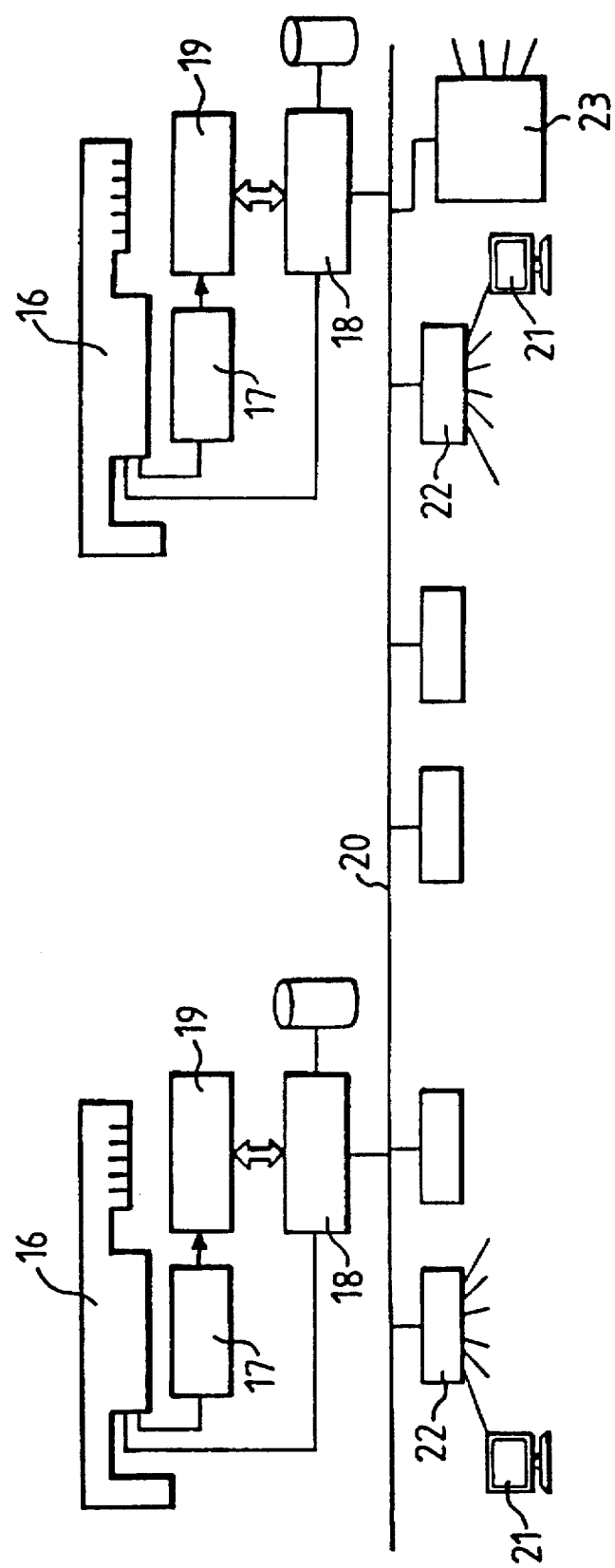
FIG. 2 is a block diagram and schematic which shows an operating variation of the invention including local, on-line/off-line incoming coding.

FIG. 2 illustrates an embodiment in which a local, on-line/off-line outgoing coding is effected, referred to herein as variation A. In this figure there are shown a number of devices 16 for inputting, scanning and mechanical storage of items provided with codes or ID tags, automatic reading devices 17, memory devices 18 for storing the video images and system controls 19. Memory devices 18 are preferably coupled with a bus system 20 which is connected to a plurality of video coding stations 21 by suitable interfaces 22. The entire system is monitored and controlled by a central unit 23. Outgoing and incoming coding can be performed in one work cycle (variation B). However, because of the considerably higher coding expenditure, the number of coding personnel must be correspondingly increased.

Figure 3:
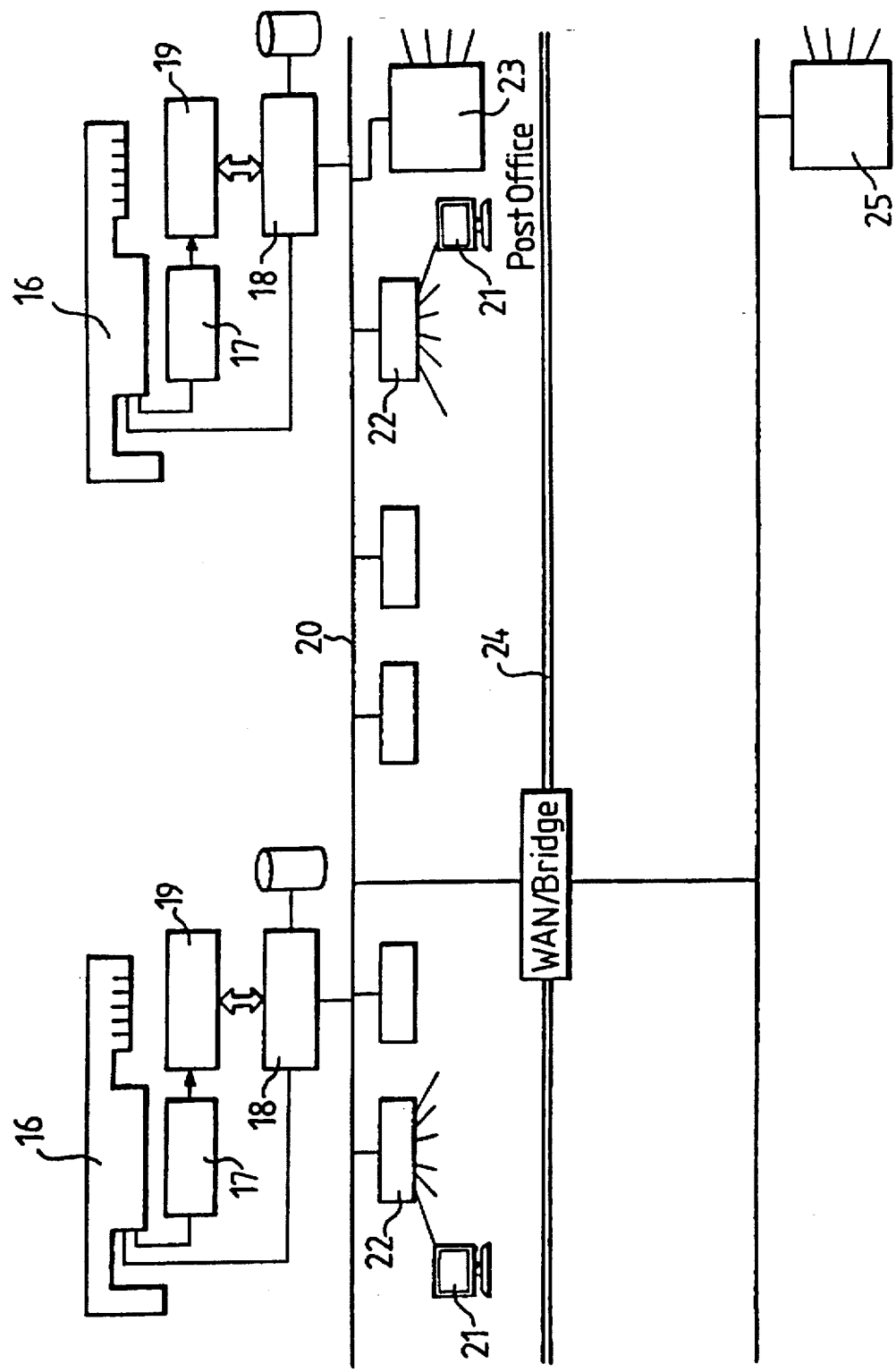
FIG. 3 is a block diagram and schematic which shows a variation including local, on-line/off-line outgoing coding and off-line incoming coding.

If inadequate coding capacities are available for complete on-line outgoing and incoming coding, initially only on-line outgoing coding is performed (see FIG. 3). However, all video images are stored for later off-line incoming coding (variation C). Local postal items can therefore be directly sorted into the distribution districts on a second pass. Outgoing mail is preferably only coded for incoming coding if the receiving post office is equipped with a distribution machine. This incoming coding can even be performed while the items are being transported to the receiving post office. However, a standard ID tag for the different post offices is required for this, as is a data transfer arrangement 24 for the receiving post offices, which receive the pre-sorted input information. As in the variations in FIG. 2, it is also possible in this case for only part of the coding personnel to perform on-line incoming coding, while the remainder perform incoming coding of the stored images.

Figure 4:
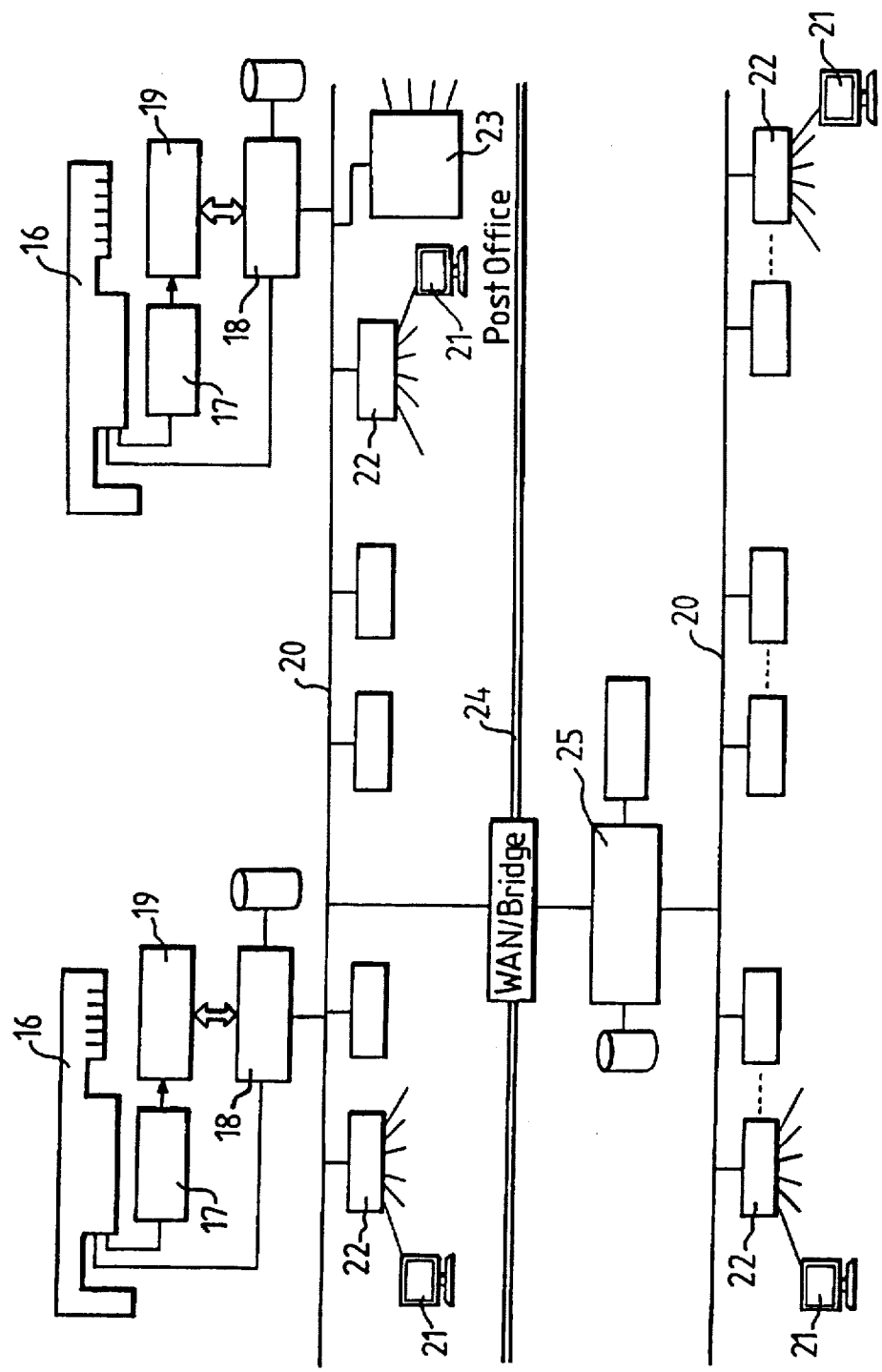
FIG. 4 is a block diagram and schematic which shows a variation including local, on-line outgoing coding and remote, off-line incoming coding.

FIG. 4 illustrates an embodiment in which the location of incoming coding is relocated from the post office into coding centers, that is, incoming coding is effected remotely (variation D). In this instance, transfer and storage means 25 for the video images, which as such are not the subject of the invention and are familiar to a person skilled in the art, are employed.

Figure 5:
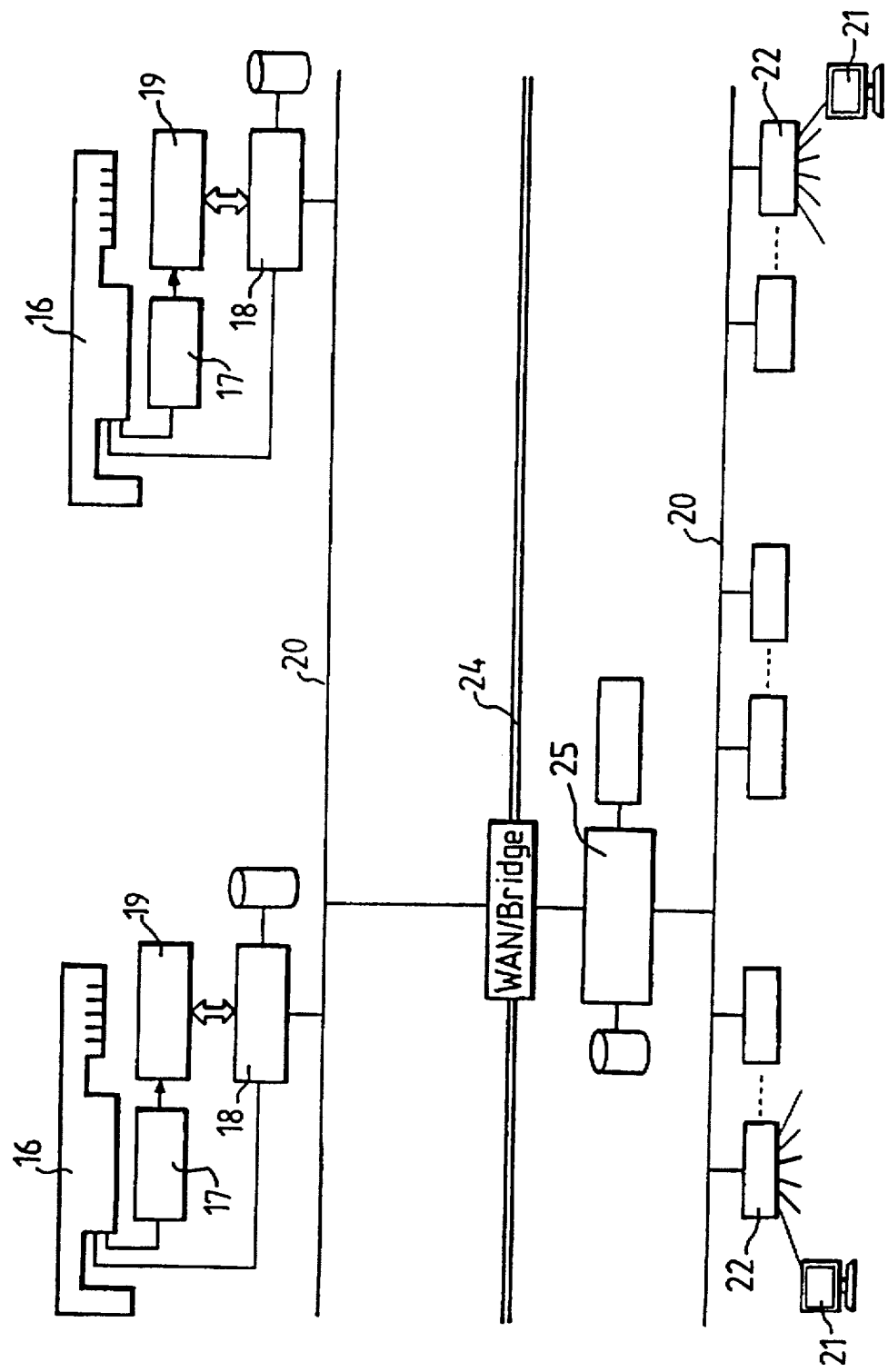
FIG. 5 is a block diagram and schematic which shows a variation including renote, off-line outgoing coding and incoming coding.

An even more complex expansion stage of networking that altogether omits locally operating coding personnel is shown in FIG. 5. Here, all video coding is performed in a center (variation E).

The five described coding strategies are respectively optimal for specific applications and problems posed; the problem can vary over time in the same post office. To take this into account, the boundaries between the individual strategies are kept fluids. In particular, it is also possible to combine the described coding strategies. For example, by combining the two coding strategies B and C, later transmission of the coding results is omitted. Namely, the local postal items are coded on-line when outgoing and coded off-line when incoming. The code, preferably the mentioned bar code, is printed on during the second sorting cycle. Outgoing postal items are coded when outgoing and coded when incoming on-line and provided with a code. A switch is preferably made from coding strategy C to strategy B when coding capacity is exceeded; below coding capacity, there is a switch from strategy B to strategy C.

A combination of coding strategies C and D is likewise advantageous. Incoming coding is primarily effected off-line and locally (variation C), possibly supported remotely and off-line (variation D) if the coding capacity in the post office is inadequate. When disturbances occur in the coding center, the switch is made from variation D to variation C.

In a further combination, outgoing coding is primarily effected locally and on-line (coding strategy D). If the coding capacity in the post office is inadequate, coding is additionally effected according to the outgoing/off-line strategy and remotely in the coding center (coding strategy E).

The invention has been described in detail with respect to preferred embodiments, and it will now be apparent from the foregoing to those ski 11 ed in the art that changes and modifications may be made without departing from the invention and its boarder aspects, and the invention, therefore, in the appended claims to cover all such changes and modifications as fall within the true spirit of the invention.

What is claimed is:

1. A method for sorting items provided with address information, comprising:
    passing the items successively through scanning means for generating a video image of each item, a mechanical storage track and a printing station;
    supplying the video images to a device for automatically reading the address information and assigning a corresponding code;
    printing in the printing station the corresponding code on the items for which the address information can be read within a predetermined time;
    storing the video images of the items for which the address information cannot be automatically read within the predetermined time in a buffer;
    supplying the respectively most recent video image stored in the buffer to a video coding station for either reading the address information and assigning a corresponding code before the item reaches the printing station and then printing the code on the item in the printing station, or if the code is not assigned before the item reaches the printing station, providing the item with an ID tag and then printing the ID tag on the item in the printing station; and storing the ID tag in order to provide the item having the ID tag with a corresponding code at a later point in time.

2. A method as defined in claim 1, including supplying the video images of items that were only provided with an ID tag at a later time to the video coding stations or means for automatic reading of the address information for assigning a code.

3. A method as defined in claim 1, distributing items provided with a code into sorting compartments according to the assigned code.

4. A method as defined in claim 1, including providing local, on-line/off-line outgoing coding in combination with local, on-line/off-line incoming coding.

5. A method as defined in claim 1, including providing local, on-line outgoing coding in combination with one of remote, off-line incoming coding, remote, off-line outgoing coding and incoming coding and remote, on-line/off-line outgoing coding and incoming coding.

6. A method as defined in claim 1, including storing in memory video images of items held in the buffer and to which no code was assigned before the items reached the printing station, and supplying video images stored in the memory to the video coding stations according to a first-in/first-out rule.

7. A method as defined in claim 1, including the step of supplying the video images generated by the scanning means to the video coding stations without first being stored in the buffer.

8. An arrangement for sorting items provided with address information, comprising:
    means for scanning and generating a video image of each item;
    means for automatically reading the address information from the video image and for assigning a corresponding code to each video image within a predetermined time;

video coding stations for reading address information from the video images and assigning a corresponding code to each video image;

a buffer in which the video image of each item is stored whose address information was not automatically read within the predetermined time, and from which the respectively most recent video image is supplied to the video coding stations for assigning a corresponding code;

a memory means coupled to the buffer for receiving the video images contained in the buffer which could not be coded by the video coding station prior to being received by the printing station, said memory mean being coupled to the video coding station for supplying the video images to the video coding stations according to a first-in/first-out rule;

a mechanical storage track for storing the items after being scanned by said scanning means;

a printing station receiving the items from said mechanical storage segment for printing on the items the assigned code; and a control unit for controlling said scanning means, said automatic reading means, said video coding stations, said mechanical storage track and said printing station.

* * * * *